United States Patent
Farkash et al.

(10) Patent No.: US 9,984,247 B2
(45) Date of Patent: May 29, 2018

(54) PASSWORD THEFT PROTECTION FOR CONTROLLING ACCESS TO COMPUTER SOFTWARE

(71) Applicant: International Business Machines Corporation, Armonk, NY (US)

(72) Inventors: Ariel Farkash, Shimshit (IL); Ayman Jarrous, Shafa-amer (IL); Micha Moffie, Zichron Yaakov (IL)

(73) Assignee: International Business Machines Corporation, Armonk, NY (US)

( * ) Notice: Subject to any disclaimer, the term of this patent is extended or adjusted under 35 U.S.C. 154(b) by 95 days.

(21) Appl. No.: 14/945,447

(22) Filed: Nov. 19, 2015

(65) Prior Publication Data
US 2017/0147826 A1    May 25, 2017

(51) Int. Cl.
| | | |
|---|---|---|
| H04L 9/30 | (2006.01) | |
| G06F 21/62 | (2013.01) | |
| H04L 9/32 | (2006.01) | |
| H04L 29/06 | (2006.01) | |

(52) U.S. Cl.
CPC ............ *G06F 21/6218* (2013.01); *H04L 9/30* (2013.01); *H04L 9/3263* (2013.01); *H04L 63/083* (2013.01)

(58) Field of Classification Search
CPC ..... G06F 21/6218; H04L 9/30; H04L 9/3263; H04L 63/083
See application file for complete search history.

(56) References Cited

U.S. PATENT DOCUMENTS

| | | | |
|---|---|---|---|
| 6,253,331 B1 * | 6/2001 | Kotani | G06F 1/14 |
| | | | 713/178 |
| 8,230,514 B2 | 7/2012 | Park | |
| 8,925,073 B2 | 12/2014 | Delia et al. | |
| 8,973,107 B2 | 3/2015 | Pemmaraju | |
| 9,077,710 B1 * | 7/2015 | Levner | H04L 63/083 |
| 9,171,147 B2 * | 10/2015 | Logan | G06F 21/46 |
| 9,619,770 B2 * | 4/2017 | Bisroev | G06Q 10/06316 |
| 2006/0036731 A1 | 2/2006 | Mossman | |

(Continued)

FOREIGN PATENT DOCUMENTS

EP    2353092    8/2011

OTHER PUBLICATIONS

Gaurav Tyagi et al., "A novel framework for password securing system from key-logger spyware", Issues and Challenges in Intelligent Computing Techniques (ICICT), 2014 International Conference on Date of Conference: Feb. 7-8, 2014, pp. 70-74.

(Continued)

Primary Examiner — Mohammad A Siddiqi
(74) Attorney, Agent, or Firm — Dan Swirsky

(57) ABSTRACT

Accessing a password-secured computer software application by acquiring an input password, generating at a first computer an output password from the input password using password generation data, where the output password differs from the input password, and providing the output password to a second computer as part of a request to access a password-secured computer software application using the output password, where the password-secured computer software application is accessible using the output password, and where the password-secured computer software application is inaccessible using the input password.

11 Claims, 4 Drawing Sheets

(56) References Cited

U.S. PATENT DOCUMENTS

| | | | |
|---|---|---|---|
| 2009/0150991 A1* | 6/2009 | Hoey | G06F 21/33 |
| | | | 726/18 |
| 2009/0177755 A1* | 7/2009 | Freeman | G06F 8/61 |
| | | | 709/212 |
| 2010/0058479 A1 | 3/2010 | Chen et al. | |
| 2010/0131755 A1* | 5/2010 | Zhu | H04L 63/0815 |
| | | | 713/155 |
| 2013/0212385 A1* | 8/2013 | Schechter | G06F 21/31 |
| | | | 713/168 |
| 2014/0136837 A1* | 5/2014 | Baylina Mele | H04L 63/083 |
| | | | 713/155 |
| 2014/0281549 A1 | 9/2014 | Pemmaraju | |
| 2015/0172310 A1 | 6/2015 | Saxena et al. | |
| 2015/0288682 A1* | 10/2015 | Bisroev | G06F 3/0481 |
| | | | 713/172 |
| 2015/0319142 A1* | 11/2015 | Herberg | H04L 63/0428 |
| | | | 713/171 |

OTHER PUBLICATIONS

Wazid, Mohammad et al., "A framework for detection and prevention of novel keylogger spyware attacks", Intelligent Systems and Control (ISCO), 2013 7th International Conference on Date of Conference: Jan. 4-5, 2013, pp. 433-438.

\* cited by examiner

PASSWORD THEFT PROTECTION FOR CONTROLLING ACCESS TO COMPUTER SOFTWARE

BACKGROUND

Passwords are commonly used to control access to computer software applications, and are therefore often the target of theft. Two common methods used by thieves to steal passwords involve identifying the individual characters of a password, by watching a user's fingers as the user enters a password using a keyboard and by using a software- or hardware-based keylogger that records the characters as they are entered by the user.

SUMMARY

In one aspect of the invention a method is provided for accessing a password-secured computer software application, the method including acquiring an input password, generating at a first computer an output password from the input password using password generation data, where the output password differs from the input password, and providing the output password to a second computer as part of a request to access a password-secured computer software application using the output password, where the password-secured computer software application is accessible using the output password, and where the password-secured computer software application is inaccessible using the input password.

In other aspects of the invention systems and computer program products embodying the invention are provided.

BRIEF DESCRIPTION OF THE DRAWINGS

Aspects of the invention will be understood and appreciated more fully from the following detailed description taken in conjunction with the appended drawings in which.

DETAILED DESCRIPTION

Figure 1:
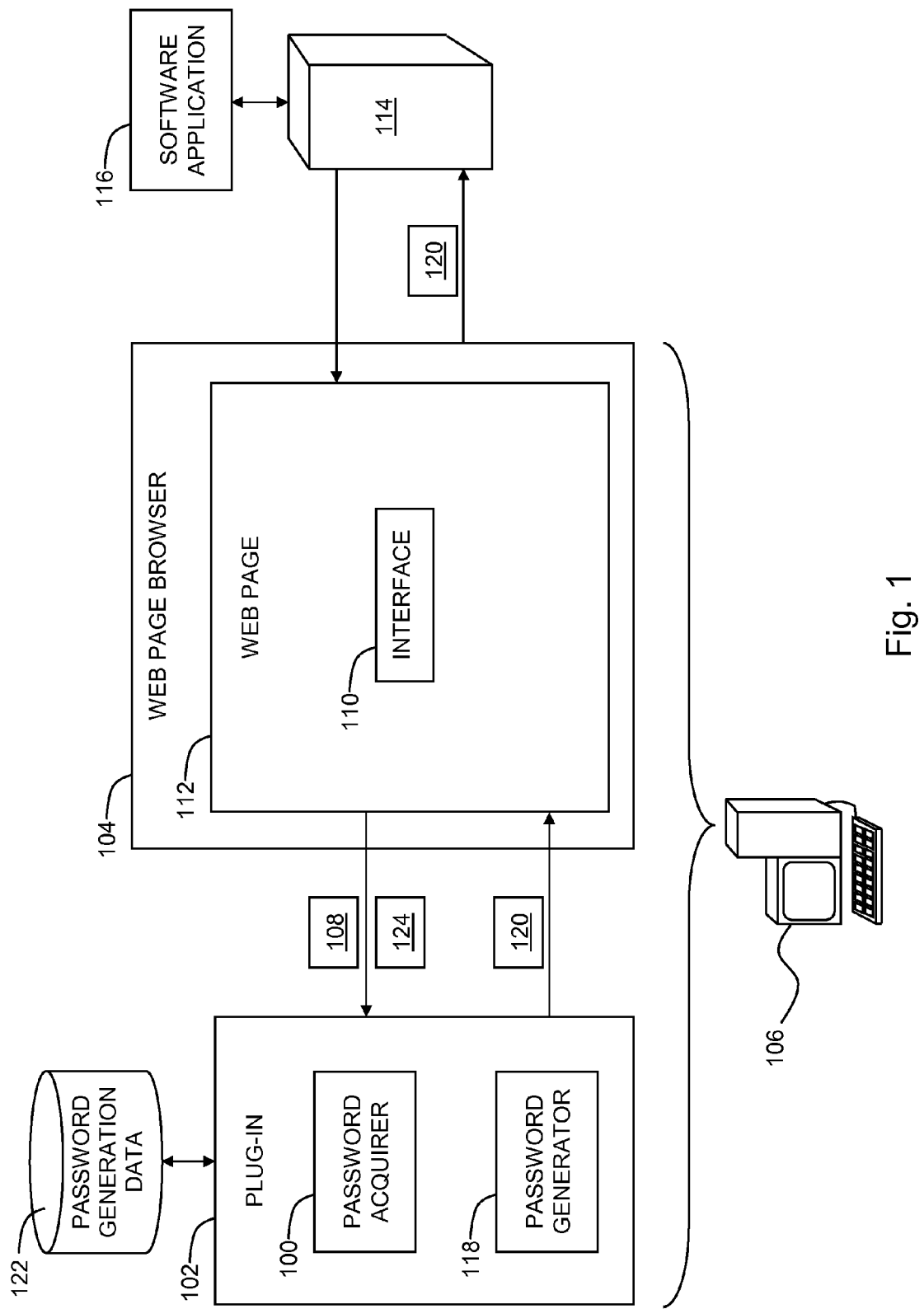
FIG. 1 is a simplified conceptual illustration of a system for accessing a password-secured computer software application, constructed and operative in accordance with an embodiment of the invention.

Embodiments of the invention may include a system, a method, and/or a computer program product. The computer program product may include a computer readable storage medium (or media) having computer readable program instructions thereon for causing a processor to carry out aspects of the invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the invention.

Aspects of the invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference is now made to FIG. 1, which is a simplified conceptual illustration of a system for accessing a password-secured computer software application, constructed and operative in accordance with an embodiment of the invention. In the system of FIG. 1, a password acquirer 100, such as may be implemented as a plug-in 102 to a web page browser 104 on a computer 106, is configured to acquire a password 108, hereinafter referred to as input password 108, such as by passively receiving input password 108 or actively intercepting input password 108 in accordance with conventional techniques. Input password 108 may, for example, be input by a computer user or an automatic form filler into an interface 110 provided by a web page 112 that is received from a computer 114 and rendered by web page browser 104. Web page 112 may, for example, be a login web page of a password-secured software application 116 that is hosted by computer 114, where computer users who wish to gain access to software application 116 must be authorized to do so by providing valid login and password information that is known to the software application 116. Password acquirer 100 is preferably configured in accordance with conventional techniques to recognize when what is being entered is a password.

A password generator 118, which may likewise be implemented in plug-in 102, is configured to generate an output password 120 from input password 108 using password generation data 122, such that the generated output password 120 differs from input password 108. Password generation data 122 may include any type of information that may be used to transform one set of characters into another set of characters in accordance with conventional techniques, and password generator 118 is configured to use password generation data 122 to transform one set of characters into another set of characters in accordance with conventional techniques. In one embodiment, password generation data 122 includes an encryption key that is designated for use by password generator 118, such as where the encryption key is generated or otherwise acquired during the installation of plug-in 102, where password generator 118 is configured to encrypt input password 108 into output password 120 in accordance with conventional techniques. Additionally or alternatively, password generation data 122 includes a seed for use with a predefined data transformation algorithm, such as where "salt" (i.e., random data) is used as a seed for a predefined one-way hashing function. Password generator 118 is preferably configured to generate output password 120 in accordance with a predefined password format, such as by applying conventional format-preserving techniques given the format of input password 108, or in view of a required format of an intended password recipient, such as software application 116. Password generation data 122 is preferably stored using conventional secure storage techniques, either on computer 106 or on another computer or data storage device, and is accessed by computer 106 using conventional secure access protocols.

Password generator 118 preferably provides output password 120 to a computer other than computer 106. Thus, in the above example, password generator 118 substitutes output password 120 in place of input password 108 in web page form data that are then sent to a destination specified by web page 112, such as to computer 114, as part of a request to access software application 116. Preferably, software application 116 is accessible using output password 120, such as where software application 116 is configured in accordance with conventional techniques to provide access to software application 116 in response to access requests that include output password 120, preferably when accompanied by a user identifier that is associated with output password 120. Software application 116 is also preferably inaccessible using input password 108, where software application 116 is configured to prevent access to software application 116 in response to access requests that include input password 108, particularly when accompanied by a user identifier that is associated with output password 120.

Password acquirer 100 and password generator 118 are preferably configured to generate multiple output passwords during multiple iterations, where during each of the iterations the same output password is generated for the same input password using the same password generation data in the manner described above regarding input password 108 and output password 120 using password generation data 122.

In another embodiment of the invention, password generator 118 is configured to generate output password 120 by using password generation data 122 in combination with web-page-related data 124 that are associated with a web page. Thus, in the above example, web-page-related data 124 may include any of a portion of a network address associated with web page 112, such as the domain portion of a Uniform Resource Locator (URL) of web page 112; and a certificate signature public key associated with web page 112, such as is used to support HTTPS traffic and is signed by a known certificate authority, such as VeriSign Inc. of Reston, Va. The version of output password 120 that is generated using password generation data 122 in combination with web-page-related data 124 is typically different than the version that is generated using password generation data 122 alone. In this manner, a fraudulent web page that is used to impersonate an authentic web page will receive a different output password 120 than would the authentic web page.

Any of the elements shown in FIG. 1 are preferably implemented in computer hardware in computer hardware and/or in computer software embodied in a non-transitory, computer-readable medium in accordance with conventional techniques.

Figure 2A:
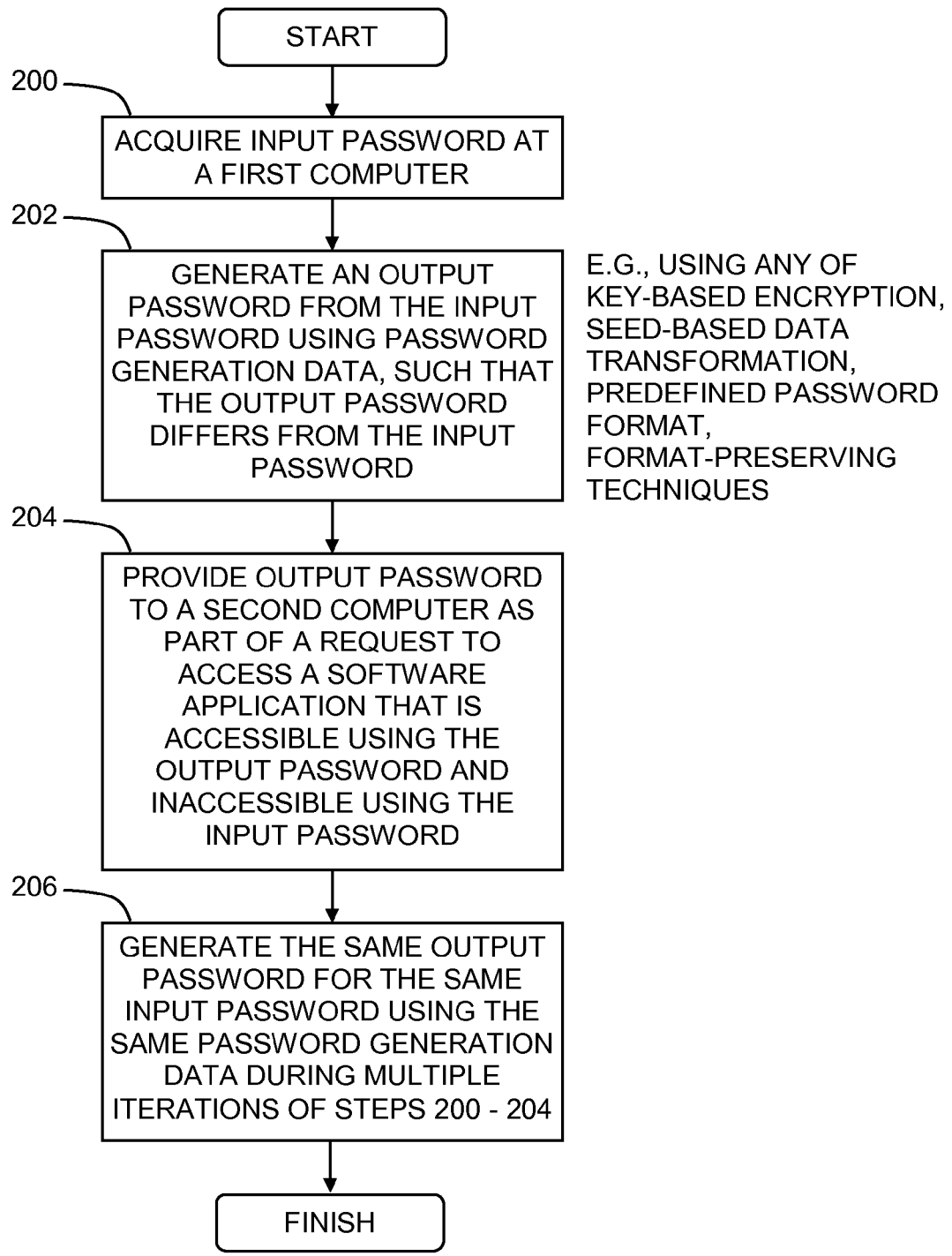
FIG. 2A is a simplified flowchart illustration of an exemplary method of operation of the system of FIG. 1, operative in accordance with an embodiment of the invention.

Reference is now made to FIG. 2A which is a simplified flowchart illustration of an exemplary method of operation of the system of FIG. 1, operative in accordance with an embodiment of the invention. In the method of FIG. 2A, an input password is acquired at a first computer (step 200). An output password is generated from the input password using password generation data, such that the generated output password differs from the input password (step 202), such as where any of key-based encryption, seed-based data transformation, a predefined password format, and format-preserving techniques are employed. The output password is provided to a second computer as part of a request to access a software application that is accessible using the output password and inaccessible using the input password (step 204). Multiple output passwords are generated during multiple iterations, where during each of the iterations the same output password is generated for the same input password using the same password generation data (step 206).

Figure 2B:
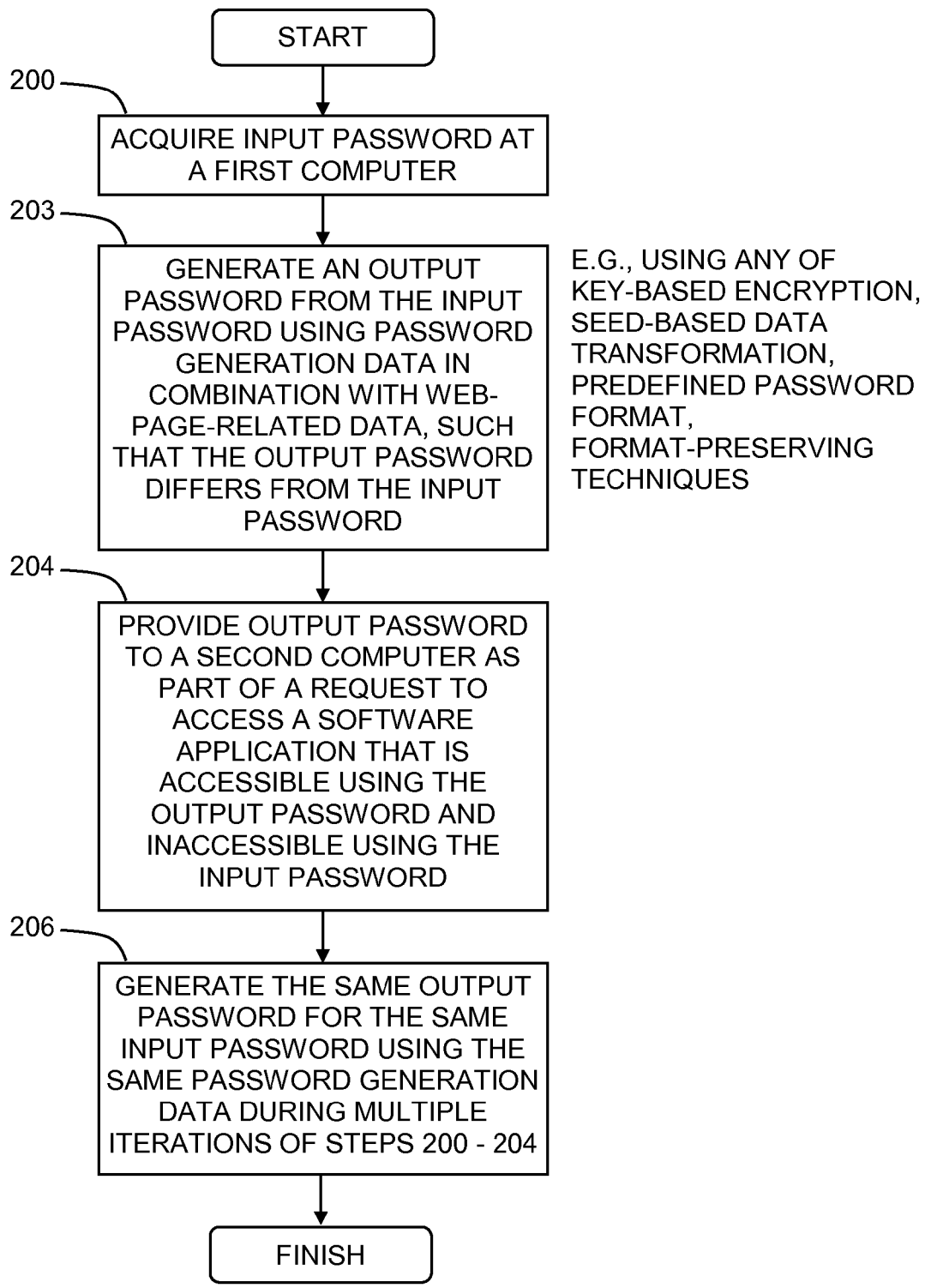
FIG. 2B is a simplified flowchart illustration of an exemplary method of operation of the system of FIG. 1, operative in accordance with an embodiment of the invention.

Reference is now made to FIG. 2B which is a simplified flowchart illustration of an exemplary method of operation of the system of FIG. 1, operative in accordance with an embodiment of the invention. The method of FIG. 2B is substantially similar to the method of FIG. 2A, but with the notable exception that step 202 of FIG. 2A is replaced in FIG. 2B with step 203 in which an output password is generated by using password generation data in combination with web-page-related data that are associated with a web page, such as where the web-page-related data includes any of a portion of a network address associated with a web page, such as the domain portion of a Uniform Resource Locator (URL) of the web page, and a certificate signature public key associated with the web page.

Figure 3:
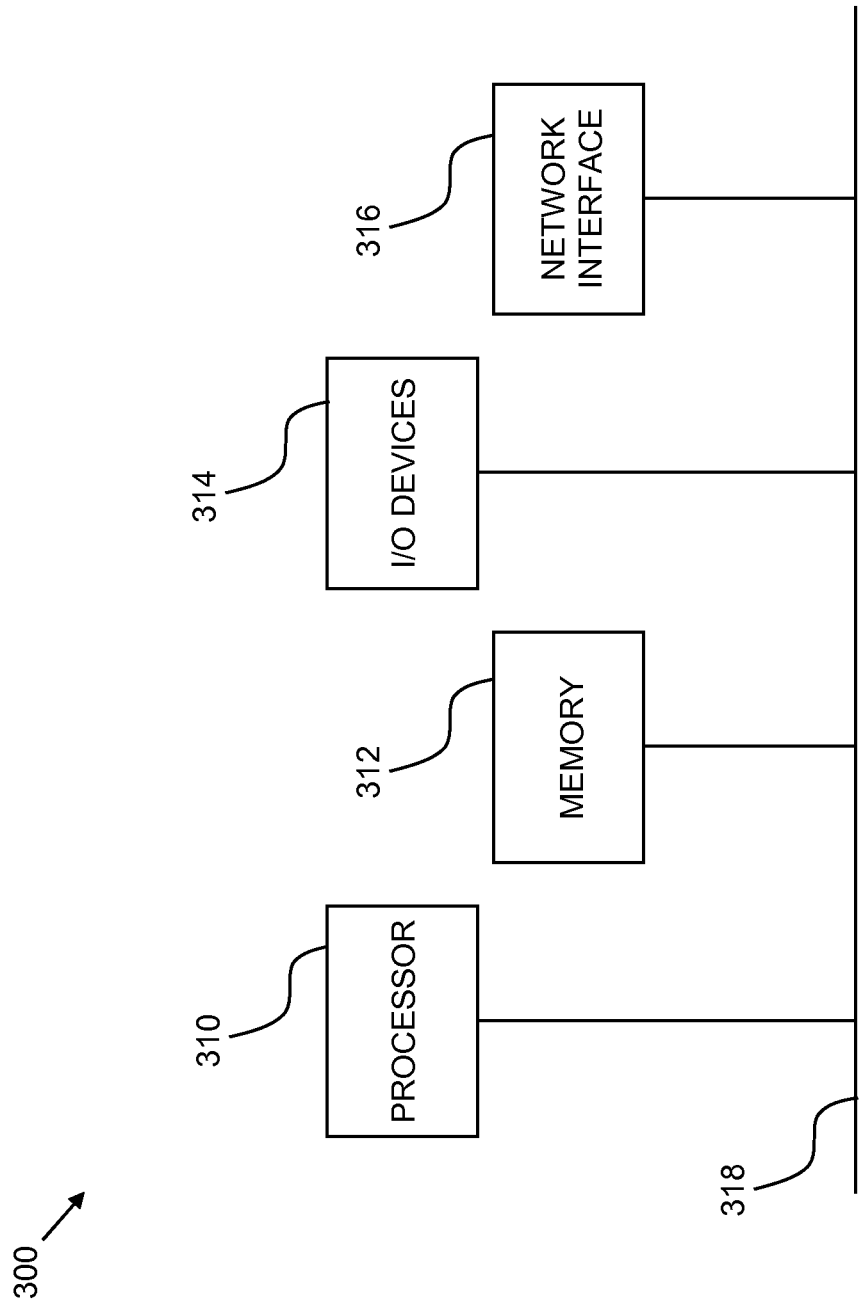
FIG. 3 is a simplified block diagram illustration of an exemplary hardware implementation of a computing system, constructed and operative in accordance with an embodiment of the invention.

Referring now to FIG. 3, block diagram 300 illustrates an exemplary hardware implementation of a computing system in accordance with which one or more components/methodologies of the invention (e.g., components/methodologies described in the context of FIGS. 1-2B) may be implemented, according to an embodiment of the invention.

As shown, the techniques for controlling access to at least one resource may be implemented in accordance with a processor 310, a memory 312, I/O devices 314, and a network interface 316, coupled via a computer bus 318 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The descriptions of the various embodiments of the invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for accessing a password-secured computer software application, the method comprising:
   acquiring an input password;
   generating at a first computer an output password from the input password using password generation data, wherein the output password differs from the input password, and
   providing the output password accompanied by a user identifier that is associated with the output password to a second computer as part of a request to access a password-secured computer software application using the output password when accompanied by the user identifier,
   wherein the password-secured computer software application is accessible using the output password when accompanied by the user identifier,
   wherein the password-secured computer software application is inaccessible using the input password when accompanied by the user identifier,
   wherein the acquiring comprises acquiring wherein the input password is input into a web page of the password-secured computer software application,
   wherein the generating comprises generating the output password by using the password generation data in combination with data associated with the web page of the password-secured computer software application, and
   wherein the generating comprises generating wherein the data associated with the web page includes any of a portion of a network address associated with the web page, and a certificate signature public key associated with the web page.

2. The method of claim 1 wherein the generating comprises generating wherein the password generation data includes an encryption key.

3. The method of claim 1 wherein the generating comprises generating wherein the password generation data includes a seed for use with a predefined data transformation algorithm.

4. The method of claim 1 wherein the generating comprises generating the output password in accordance with a predefined password format.

5. A system for accessing a password-secured computer software application, the system comprising:
   a password acquirer configured to acquire an input password; and
   a password generator configured to
      generate at a first computer an output password from the input password using password generation data, wherein the output password differs from the input password, and
      provide the output password accompanied by a user identifier that is associated with the output password to a second computer as part of a request to access a password-secured computer software application using the output password when accompanied by the user identifier,
   wherein the password-secured computer software application is accessible using the output password when accompanied by the user identifier,
   wherein the password-secured computer software application is inaccessible using the input password when accompanied by the user identifier,
   wherein the input password is input into a web page of the password-secured computer software application,
   wherein the password generator is configured to generate the output password by using the password generation data in combination with data associated with the web page of the password-secured computer software application, and
   wherein the data associated with the web page includes any of a portion of a network address associated with the web page, and a certificate signature public key associated with the web page.

6. The system of claim 5 wherein the password generation data includes an encryption key.

7. The system of claim 5 wherein the password generation data includes a seed for use with a predefined data transformation algorithm.

8. The system of claim 5 wherein the password generator is configured to generate the output password in accordance with a predefined password format.

9. A computer program product for accessing a password-secured computer software application, the computer program product comprising:
   a non-transitory, computer-readable storage medium; and
   computer-readable program code embodied in the storage medium, wherein the computer-readable program code is configured to
      acquire an input password,
      generate at a first computer an output password from the input password using password generation data, wherein the output password differs from the input password, and
      provide the output password accompanied by a user identifier that is associated with the output password to a second computer as part of a request to access a password-secured computer software application using the output password when accompanied by the user identifier,
      wherein the password-secured computer software application is accessible using the output password when accompanied by the user identifier,
      wherein the password-secured computer software application is inaccessible using the input password when accompanied by the user identifier,
      wherein the input password is input into a web page of the password-secured computer software application,
      wherein the computer-readable program code is configured to generate the output password by using the password generation data in combination with data associated with the web page of the password-secured computer software application, and
      wherein the data associated with the web page includes any of a portion of a network address associated with the web page, and a certificate signature public key associated with the web page.

10. The computer program product of claim 9 wherein the password generation data includes an encryption key.

11. The computer program product of claim 9 wherein the password generation data includes a seed for use with a predefined data transformation algorithm.

* * * * *